US011679456B2

(12) United States Patent
Craig et al.

(10) Patent No.: US 11,679,456 B2
(45) Date of Patent: Jun. 20, 2023

(54) POWER END HUB PULLER KIT APPARATUS AND METHODS

(71) Applicant: FORUM US, INC., Houston, TX (US)

(72) Inventors: Thomas Craig, Azle, TX (US); Miles Baker, Sanger, TX (US); Ethan Anderson, Fort Worth, TX (US)

(73) Assignee: Forum US, Inc., Houston, TX (US)

( * ) Notice: Subject to any disclaimer, the term of this patent is extended or adjusted under 35 U.S.C. 154(b) by 408 days.

(21) Appl. No.: 16/881,925

(22) Filed: May 22, 2020

(65) Prior Publication Data

US 2021/0362280 A1 Nov. 25, 2021

(51) Int. Cl.
| | | |
|---|---|---|
| B23P 19/027 | (2006.01) | |
| B23P 19/04 | (2006.01) | |
| B23P 19/02 | (2006.01) | |
| F04B 53/22 | (2006.01) | |
| E21B 43/26 | (2006.01) | |
| F04B 15/02 | (2006.01) | |

(52) U.S. Cl.
CPC .......... *B23P 19/027* (2013.01); *B23P 19/025* (2013.01); *F04B 53/22* (2013.01); *B23P 19/04* (2013.01); *E21B 43/2607* (2020.05); *F04B 15/02* (2013.01); *Y10T 29/49238* (2015.01); *Y10T 29/49822* (2015.01)

(58) Field of Classification Search
CPC ..... B23P 19/027; B23P 19/025; B25B 27/026
See application file for complete search history.

(56) References Cited

U.S. PATENT DOCUMENTS

| | | | |
|---|---|---|---|
| 1,964,470 A | 6/1934 | King | |
| 2,861,329 A | 11/1958 | Bishman | |
| 3,334,404 A | 8/1967 | Torlay | |
| 3,638,294 A * | 2/1972 | Durant | ................. B25B 27/026 29/252 |
| 4,893,395 A | 1/1990 | Crowder | |

(Continued)

FOREIGN PATENT DOCUMENTS

| | | | |
|---|---|---|---|
| CN | 205025746 U | 2/2016 | |
| FR | 2755064 A1 * | 4/1998 | ........... B25B 27/023 |

OTHER PUBLICATIONS

International Search Report and Written Opinion dated Aug. 31, 2021 for International Application No. PCT/US2021/033332.

(Continued)

*Primary Examiner* — Sarang Afzali
(74) *Attorney, Agent, or Firm* — Patterson + Sheridan, LLP (57) ABSTRACT

A hub puller kit for pulling hubs off of power ends of frac pumps, and a method of removing a hub from a pinion shaft of a power end using the hub puller kit. The hub puller kit has an adapter flange formed out of a monolithic body with fastener openings, and a hydraulic actuator coupled to the adapter flange. The adapter flange has a stepped surface formed on a first surface and a recessed surface formed in a second surface, and a central opening having a threaded flange portion that extends from the stepped surface to the recessed surface. The hydraulic actuator has a hydraulic cylinder and a hydraulic plunger disposed at least partially within the hydraulic cylinder, and a threaded actuator portion that engages the threaded flange portion to couple the hydraulic actuator to the adapter flange.

19 Claims, 7 Drawing Sheets

(56) References Cited

U.S. PATENT DOCUMENTS

| | | | |
|---|---|---|---|
| 5,634,734 A * | 6/1997 | Schron, Jr. | ............... B66C 1/66 |
| | | | 294/215 |
| 8,997,322 B1 | 4/2015 | Barquist | |
| 9,539,709 B2 | 1/2017 | Campoli | |
| 2019/0217456 A1 | 7/2019 | McGriff | |

OTHER PUBLICATIONS

"Industrial and Off-Highway Americardan Universal Driveshafts", Ameridrives, Dec. 2018, pp. 1-30.
"Driveshafts for Industrial Applications", Spicer Gelenkwellenbau GmbH, Jun. 2015, pp. 1-53.

* cited by examiner

POWER END HUB PULLER KIT APPARATUS AND METHODS

BACKGROUND

Field

Aspects of the disclosure relate to hub puller kit apparatus and methods, and associated components thereof, for pulling hubs off of power ends. In one example, the hub puller kit apparatus and methods are used to pull a hub off of a power end of a frac pump.

Description of the Related Art

Attempts to pull hubs off of power ends of frac pumps have incurred several drawbacks, such as difficulty of use, high maintenance times, high maintenance costs, and increased chances of damaging equipment.

Therefore, there is a need for hub puller kit apparatus and methods that efficiently and effectively remove hubs from power ends while facilitating ease of use, low maintenance times, low maintenance costs, and reduced changes of damaging equipment.

SUMMARY

Aspects of the disclosure relate to hub puller kit apparatus and methods, and associated components thereof, for pulling hubs off of power ends. In one example, the hub puller kit apparatus and methods are used to pull a hub off of a power end of a frac pump.

In one implementation, a hub puller kit for power ends of frac pumps includes an adapter flange. The adapter flange includes a first surface, a second surface, one or more sets of fastener openings extending from the first surface to the second surface, and a central opening. The one or more sets of fastener openings are disposed radially outside of the central opening. The hub puller kit includes a hydraulic actuator coupled to the adapter flange. The hydraulic actuator includes a hydraulic cylinder and a hydraulic plunger disposed at least partially within the hydraulic cylinder.

In one implementation, a method of removing a hub from a pinion shaft of a power end using a hub puller kit includes positioning an adapter flange of the hub puller kit adjacent a first surface of the hub. The method includes fastening the adapter flange to the hub, and pressurizing a hydraulic actuator coupled to the adapter flange to apply a first force to the hub in a first direction and a second force to the pinion shaft in a second direction. The second direction is opposite of the first direction. The method includes moving the hub away from the pinion shaft.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the disclosure relate to hub puller kit apparatus and methods, and associated components thereof, for pulling hubs off of power ends. In one example, the hub puller kit apparatus and methods are used to pull a hub off of a power end of a frac pump.

The disclosure contemplates that terms such as "couples," "coupling," "couple," and "coupled" may include but are not limited to welding, interference fitting, and/or fastening such as by using bolts, threaded connections, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling.

Figure 1:
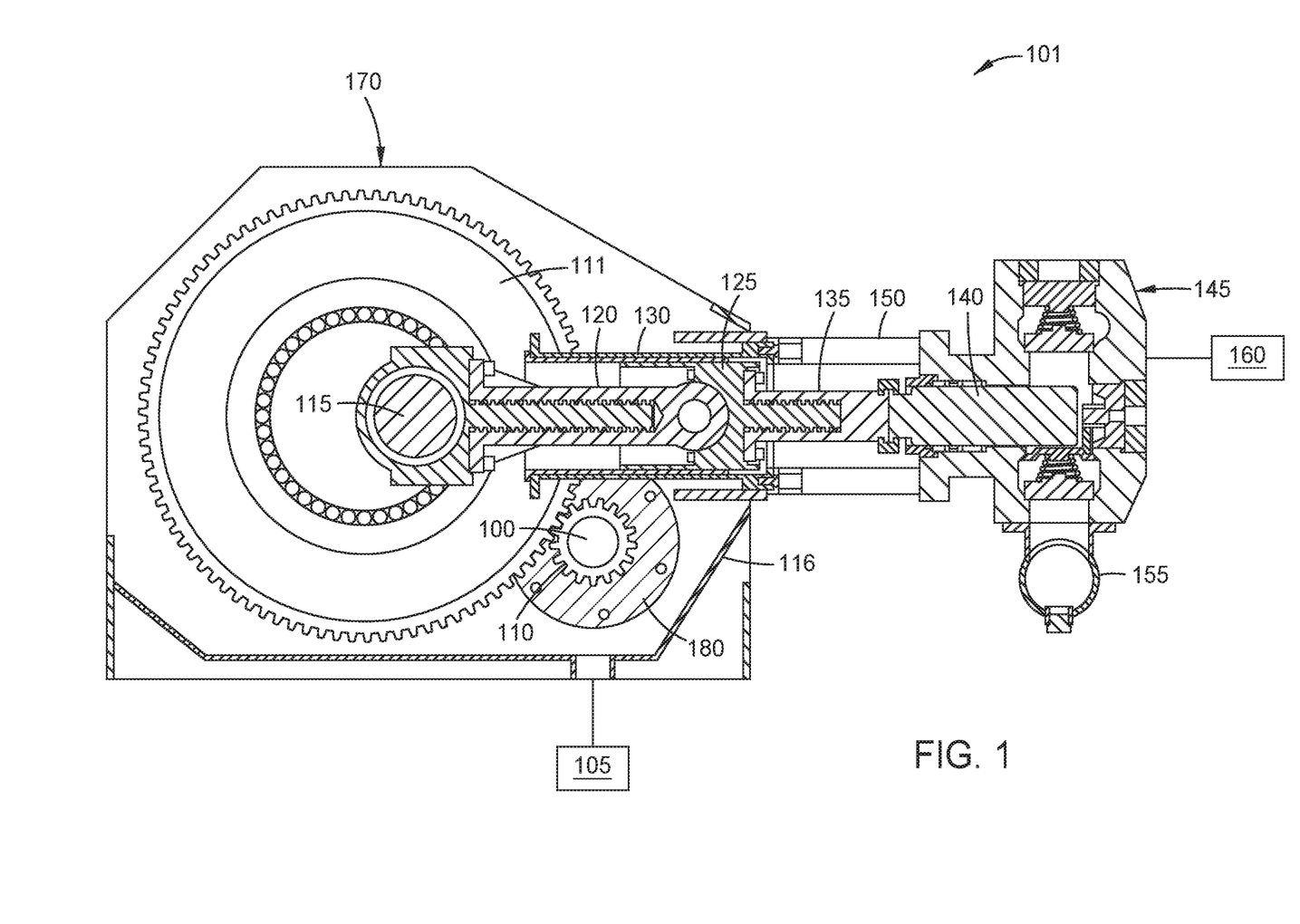
FIG. 1 is a schematic sectional partial view of a reciprocating pump where aspects of the disclosure may be used, according to one implementation.

FIG. 1 is a schematic sectional partial view of a reciprocating pump 101 where aspects of the disclosure may be used, according to one implementation. The reciprocating pump 101 is of a type utilized for oil and gas well service operations, such as pumping high pressure fluid into a well to hydraulically fracture the reservoir. In one example, the reciprocating pump 101 is a frac pump. The reciprocating pump 101 may also be configured for pumping drilling fluid into the well during drilling. The reciprocating pump 101 includes a power end 170 and a fluid end 145.

The reciprocating pump 101 may include a power source 105, such as a motor, operably coupled to a pinion shaft 100 to rotate the pinion shaft 100. The pinion shaft 100 includes pinion gears 110 on both ends of the pinion shaft 100 (only one pinion gear 110 is shown). Gear teeth on the pinion gears 110 mate with gear teeth on corresponding bull gears 111 (one bull gear 111 is shown in FIG. 1) to drive the bull gears 111, which are connected to a crankshaft 115. The pinion shaft 100 is supported in a housing 116 of the reciprocating pump 101 by bearings.

A hub 180 is coupled to the pinion shaft 100 adjacent or at each end of the pinion shaft 100 (one hub 180 is shown in FIG. 1). In one example, the hub 180 is shrink fitted to the pinion shaft 100 of the power end 170. The hub 180 may be removed from the pinion shaft 100 and moved away from the pinion shaft 100 to facilitate maintaining, servicing, repairing, and/or replacing components or aspects of the reciprocating pump 101. The hub 180 is removed from the pinion shaft 100 using aspects described herein.

One or more connecting rods 120 are coupled to the crankshaft 115. Each connecting rod 120 is connected to a crosshead 125, and each crosshead 125 moves in a linear stroke within a stationary crosshead casing 130. A pony rod 135 secures each crosshead 125 to a plunger 140 disposed in a fluid end 145. Tie rods 150 connect the fluid end 145 to an end portion of the reciprocating pump 101. As the plunger 140 is stroked, fluid is brought into the fluid end 145 from an intake 155 and discharged at higher pressure out a discharge 160. In one example, the gear teeth of the pinion gears 110 and the gear teeth of the bull gears 111 are timed to facilitate operation and performance of the reciprocating pump 101.

Figure 2A:
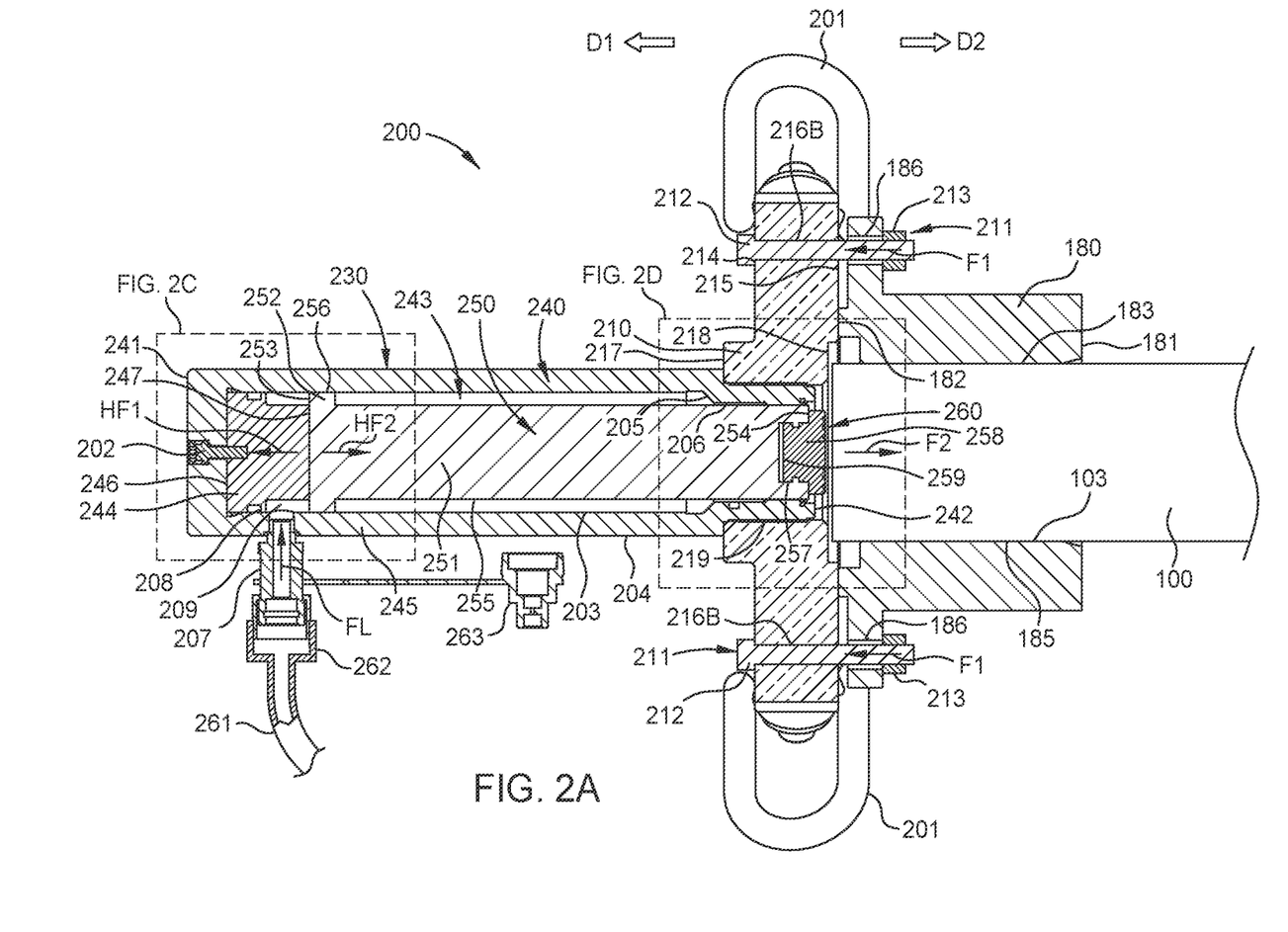
FIG. 2A is a schematic sectional partial view of a hub puller kit in a retracted state, according to one implementation.

FIG. 2A is a schematic sectional partial view of a hub puller kit 200 in a retracted state, according to one implementation. The hub puller kit 200 is actuatable between the retracted state and an extended state illustrated in FIG. 2B. The hub puller kit 200 is used to remove the hub 180 from the pinion shaft 100 and away from the pinion shaft 100. The hub puller kit 200 includes an adapter flange 210 and a hydraulic actuator 230 coupled to the adapter flange 210. The hydraulic actuator 230 includes a hydraulic cylinder 240 coupled to the adapter flange 210 and a hydraulic plunger 250 disposed at least partially in the hydraulic cylinder 240. The hydraulic plunger 250 is illustrated in a retracted position in FIG. 2A. The hydraulic plunger 250 is movable between the retracted position and an extended position (illustrated in FIG. 2B).

The hub 180 includes a first surface 182, a second surface 181, and a central opening 183 extending from the second surface 181 to the first surface 182. The central opening 183 receives at least a portion of the pinion shaft 100. In one example, an inner surface 185 of the hub 180 is shrink fitted to an outer surface 103 of the pinion shaft 100. The adapter flange 210 of the hub puller kit 200 is positioned adjacent the first surface 182 of the hub 180. The first surface 182 is a first exterior surface of the hub 180. In one example, the adapter flange 210 is positioned adjacent the hub 180 by lifting one or more lift handles 201 coupled to the adapter flange 210 and moving the hub 180 adjacent the hub 180. The adapter flange 210 is fastened to the hub 180 using a plurality of fasteners 211. The fasteners 211 may include one or more of bolts, screws, pins, rivets, and/or nuts. Each fastener 211 of the fasteners 211 illustrated includes a bolt 212 and a nut 213 threaded onto the bolt 212.

Figure 2B:
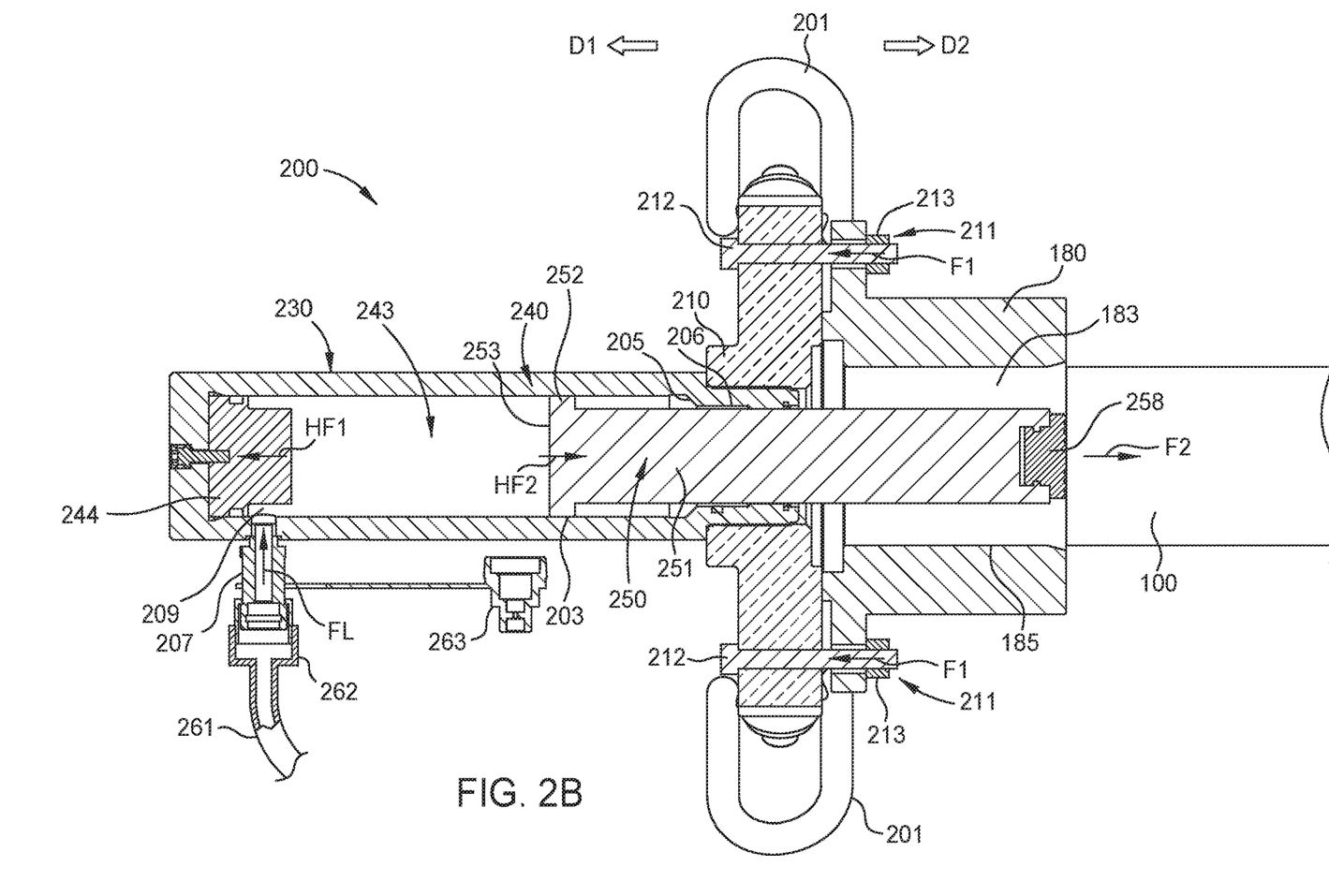
FIG. 2B is a schematic sectional partial view of a hub puller kit in an extended state, according to one implementation.

The adapter flange 210 includes a first surface 214, a second surface 215, and one or more sets of fastener openings 216 formed in the adapter flange 210 and extending from the first surface 214 to the second surface 215 (a second set of fastener openings 216B is illustrated in FIGS. 2A and 2B). The adapter flange 210 includes a stepped surface 217 that is formed on and steps outward from the first surface 214, and a recessed surface 218 that is formed in and recessed into the second surface 215. The adapter flange 210 includes a central opening 219 that extends from the stepped surface 217 to the recessed surface 218. Each of the one or more sets of fastener openings 216 is disposed radially outside of the central opening 219. The plurality of bolts 212 of the plurality of fasteners 211 are disposed through the second set of fastener openings 216B formed in the adapter flange 210, and through a set of openings 186 formed in the hub 180. The plurality of nuts 213 are threaded onto the plurality of bolts 212. The set of openings 186 includes at least two openings formed in the hub 180, such as four openings formed in the hub 180.

The hydraulic cylinder 240 is threaded into the adapter flange 210. The hydraulic plunger 250 includes a rod 251 and a head 252 that steps outward from the rod 251. The head 252 includes an outer diameter that is larger than an outer diameter of the rod 251. The hydraulic plunger 250 includes a first end surface 253 adjacent the head 252 and a second end surface 254 that is opposite of the first end surface 253. The rod 251 includes a first outer surface 255. The head 252 includes a second outer surface 256. The rod 251 includes an opening 257 formed in the second end surface 254. The hydraulic actuator 230 includes a cap 258 coupled to the hydraulic plunger 250. The cap 258 is a protective cap that facilitates prevention of wear and tear of the rod 251 and the pinion shaft 100. In one example, the cap 258 is a polymeric cap. The cap 258 includes a first surface 259 and a second surface 260 opposite of the first surface 259.

The hydraulic cylinder 240 includes a first end surface 241 and a second end surface 242 opposite of the first end surface 241. The first end surface 241 is closed, and the second end surface 242 is open. The hydraulic cylinder 240 includes one or more sidewalls 245, an internal chamber 243 formed in the hydraulic cylinder 240, and a cap 244 adjacent the first end surface 241. The cap 244 includes a first surface 246 and a second surface 247. In one example, the cap 244 is fastened to the hydraulic cylinder 240 using one or more fasteners 202 such that the first surface 246 is engaged with an inner end surface of the hydraulic cylinder 240. In one example, the cap 244 is integrally formed with the hydraulic cylinder 240 such that the second surface 247 is the inner end surface of the hydraulic cylinder 240. The hydraulic cylinder 240 includes a first inner circumferential surface 203 and an outer circumferential surface 204. The hydraulic cylinder 240 includes a necked surface 205 that necks inward relative to the first inner circumferential surface 203. The necked surface 205 is between the first inner circumferential surface 203 and a second inner circumferential surface 206 of the hydraulic cylinder 240. The second inner circumferential surface 206 includes an outer diameter that is less than an outer diameter of the first inner circumferential surface 203 and less than the outer diameter of the head 252.

The hub puller kit 200 includes a hydraulic conduit 207 coupled to the hydraulic cylinder 240. The cap 244 includes a recessed surface 208 radially outside of the second surface 247. The internal chamber 243 of the hydraulic cylinder 240 includes a pressure chamber 209 between the recessed surface 208 of the cap 244 and the first end surface 253 of the hydraulic plunger 250. The pressure chamber 209 is between the recessed surface 208 of the cap 244 and the head 252 of the hydraulic plunger 250. The hub puller kit 200 includes a hydraulic hose 261. The hydraulic hose 261 includes a first connection 262 at a first end of the hydraulic hose 261 that is coupled to the hydraulic conduit 207. The hub puller kit 200 includes a cover 263 that covers the hydraulic conduit 207 when the hydraulic hose 261 is not coupled to the hydraulic conduit 207.

The hydraulic plunger 250 is in the retracted position when the hub puller kit 200 is in the retracted state. In one embodiment, which can be combined with other embodiments, the first end surface 253 of the hydraulic plunger 250 is engaged with and abuts against the second surface 247 of the cap 244 in the retracted position. The hydraulic actuator 230 is hydraulically actuated to move the hydraulic plunger 250 from the retracted position to the extended position. The hydraulic actuator 230 is hydraulically actuated by pressurizing the hydraulic actuator 230. The hydraulic actuator 230 is pressurized by pumping a hydraulic fluid FL into the pressure chamber 209 of the internal chamber 243. The hydraulic fluid FL is pumped into the pressure chamber 209 by flowing the hydraulic fluid FL through the hydraulic hose 261, through the hydraulic conduit 207, and into the pressure chamber 209. The hydraulic fluid FL is pumped and pressurized using a hydraulic pump that is fluidly connected to the hydraulic hose 261. The hydraulic fluid FL is pressurized to generate a first hydraulic force HF1 on the recessed surface 208 of the cap 244 of the hydraulic cylinder 240. The first hydraulic force HF1 is in a first direction D1. The first direction D1 points from the hub 180 and toward the adapter flange 210 and the hydraulic actuator 230.

The hydraulic fluid FL is also pressurized to generate a second hydraulic force HF2 on at least a portion of the first end surface 253 of the hydraulic plunger 250. The second hydraulic force HF2 is in a second direction D2 that is opposite of the first direction D1. The second direction D2 points away from the hydraulic actuator 230 and the adapter flange 210 and toward the hub 180. In one example, the second hydraulic force HF2 moves the hydraulic plunger 250 in the second direction D2 relative to the hydraulic cylinder 240 and the adapter flange 210 and into engagement with the pinion shaft 100.

The first hydraulic force HF1 generated on the hydraulic cylinder 240 transfers through the adapter flange 210 and the one or more sets of fasteners 211 to apply one or more first forces F1 to the hub 180. The first forces F1 are in the first direction D1. The second hydraulic force HF2 generated on the hydraulic plunger 250 transfers through the rod 251 and the cap 258 of the hydraulic plunger 250 to apply one or more second forces F2 to the pinion shaft 100. The second forces F2 are in the second direction D2.

The one or more first forces F1 pull on the hub 180 in the first direction D1 and the one or more second forces F2 push on the pinion shaft 100 in the second direction D2. The first forces F1 and the second forces F2 facilitate overcoming the frictional forces between the hub 180 and the pinion shaft 100 that result from coupling the hub 180 and the pinion shaft 100 (such as by shrink fitting) to separate and remove the hub 180 from the pinion shaft 100 and move the hub 180 away from the pinion shaft 100.

FIG. 2B is a schematic sectional partial view of a hub puller kit 200 in an extended state, according to one implementation. The hydraulic plunger 250 has moved from the retracted position (illustrated in FIG. 2A) to an extended position illustrated in FIG. 2B. The first hydraulic force HF1 and the one or more first forces F1 moved the hub 180, the adapter flange 210, and the hydraulic cylinder 240 in the first direction D1 and relative to the hydraulic plunger 250 and the pinion shaft 100. The second hydraulic force HF2 and the one or more second forces F2 moved the hydraulic plunger and the pinion shaft 100 in the second direction D2 and relative to the hub 180, the adapter flange 210, and the hydraulic cylinder 240. The hub 180 has been moved relative to the pinion shaft 100 to remove the hub 180 from the pinion shaft 100. The hub 180 is removed from the pinion shaft 100 such that the pinion shaft 100 is outside of the central opening 183 and is disengaged from the inner surface 185 of the hub 180.

After the hub 180 is removed from the pinion shaft 100, the hub 180 is suspended from and supported on the adapter flange 210 using the fasteners 211. The hub 180 can be moved away from the pinion shaft 100 using the hub puller kit 200, for example by moving the adapter flange 210 using the lift handles 201 coupled to the adapter flange 210. In one example, the hub 180 is moved using a lift device, such as a crane, that is connected to the lift handles 201 to lift the lift handles 201.

The hydraulic plunger 250 is retracted from the extended position to the retracted position by de-pressurizing the pressure chamber 209 and applying a force, such as a manual force, to the hydraulic plunger 250 in the first direction D1 to push the hydraulic plunger 250 into the hydraulic cylinder 240. The pressure chamber 209 is de-pressurized by pumping the hydraulic fluid FL out of the pressure chamber 209, through the hydraulic hose 261, and into a fluid chamber of the hydraulic pump. After the pressure chamber 209 is de-pressurized, a force is applied to the hydraulic plunger 250 in the first direction D1 to move the hydraulic plunger 250 relative to the hydraulic cylinder 240 and into the retracted position. In one embodiment, which can be combined with other embodiments, an operator may use their hands to apply a manual force to the hydraulic plunger 250, such as by applying the manual force to the cap 258.

The necked surface 205 acts as a longitudinal stop for the hydraulic plunger 250 such that the head 252 abuts against the necked surface 205 to facilitate retaining the hydraulic plunger 250 within the internal chamber 243 of the hydraulic cylinder 240 and preventing the hydraulic plunger 250 from falling out of the internal chamber 243.

Figure 2C:
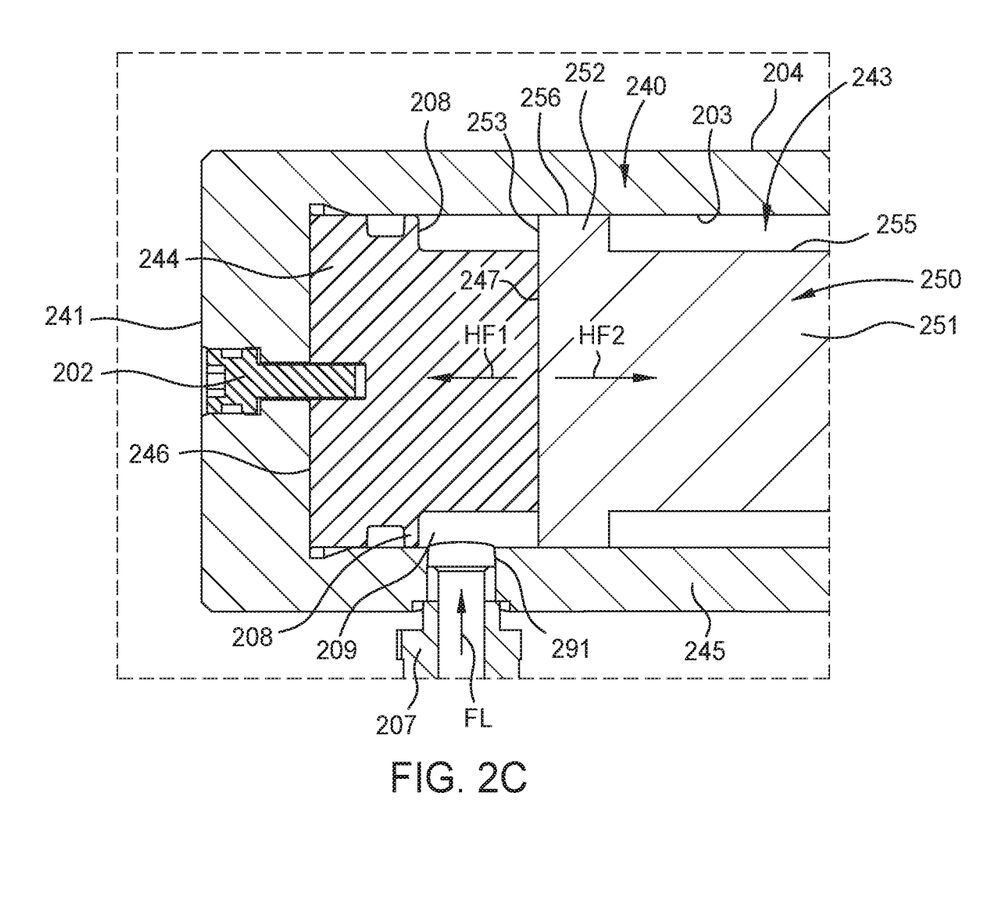
FIG. 2C is a schematic partial enlarged view of the hub puller kit illustrated in FIG. 2A in the retracted state, according to one implementation.

FIG. 2C is a schematic partial enlarged view of the hub puller kit 200 illustrated in FIG. 2A in the retracted state, according to one implementation. The hydraulic cylinder 240 includes a fluid opening 291 formed in the one or more sidewalls 245. The hydraulic fluid FL pumped into the pressure chamber 209 is flowed through the hydraulic conduit 207, the fluid opening 291, and into the pressure chamber 209 to pressurize the hydraulic actuator 230. In one embodiment, which can be combined with other embodiments, the hydraulic fluid FL is pressurized to an operating pressure within a range of 1,000 psi to 10,000 psi to remove the hub 180 from the pinion shaft 100. In one example, the operating pressure is within a range of 4,000 psi to 8,000 psi.

Figure 2D:
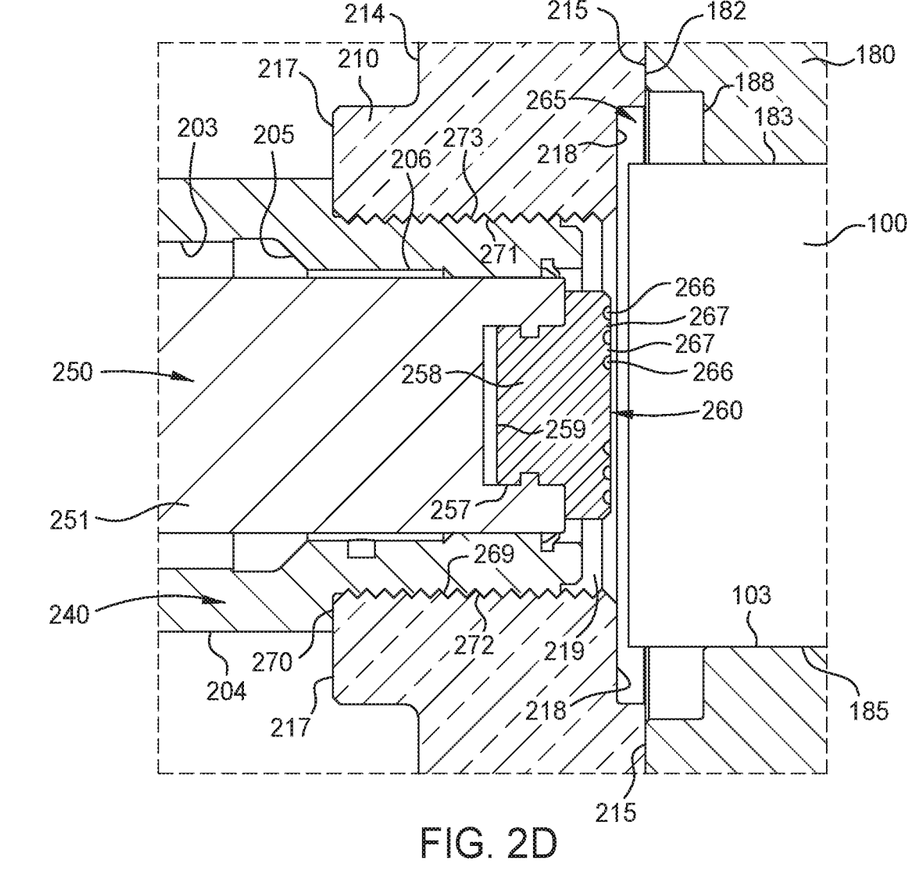
FIG. 2D is a schematic partial enlarged view of the hub puller kit illustrated in FIG. 2A in the retracted state, according to one implementation.

FIG. 2D is a schematic partial enlarged view of the hub puller kit 200 illustrated in FIG. 2A in the retracted state, according to one implementation. The hub 180 includes a recessed surface 188 formed in the first surface 182 and adjacent to the central opening 183. The recessed surface 188 is between the first surface 182 and the inner surface 185.

The adapter flange 210 includes a recess 265 formed in the second surface 215 to form the recessed surface 218. In the implementation illustrated, the pinion shaft 100 protrudes past the first surface 182 of the hub 180 such that the pinion shaft 100 moves at least partially past the first surface 182 and into the recess 265 as the second surface 215 of the adapter flange 210 is positioned adjacent and into engagement with the first surface 182 of the hub 180. The pinion shaft 100 may extend past the first surface 182 and into the recess 265 due to manufacturing parameters, installation, dimensional tolerances, and/or operation of the power end 170. The recessed surface 218 facilitates modularity of the hub puller kit 200 in removing the hub 180 under circumstances where the pinion shaft 100 protrudes past the first surface 182 of the hub 180.

The cap 258 includes a plurality of recesses 266 and a plurality of ridges 267 formed in the second surface 260 of the cap 258. The ridges 267 and recesses 266 facilitate gripping the pinion shaft 100 to push the pinion shaft 100, and facilitate prevention of wear and tear of the rod 251 and the pinion shaft 100.

The hydraulic cylinder 240 includes an outer surface 269 that is recessed inward relative to the outer circumferential surface 204 to form a shoulder 270 between the outer surface 269 and the outer circumferential surface 204. The hydraulic cylinder 240 includes a threaded actuator portion 271 formed in the outer surface 269. The adapter flange 210 includes an inner surface 272 and a threaded flange portion 273 formed in the inner surface 272. The hydraulic cylinder 240 is coupled to the adapter flange 210 using the threaded actuator portion 271 and the threaded flange portion 273. The threaded actuator portion 271 is threaded into the threaded flange portion 273. In one example, the threaded actuator portion 271 is threaded into the threaded flange portion 273 such that the shoulder 270 of the hydraulic cylinder 240 is engaged with and abuts against the first surface 217 of the adapter flange 210. In one example, the threaded flange portion 273 and the threaded actuator portion 271 have the same thread pitch.

Figure 2E:
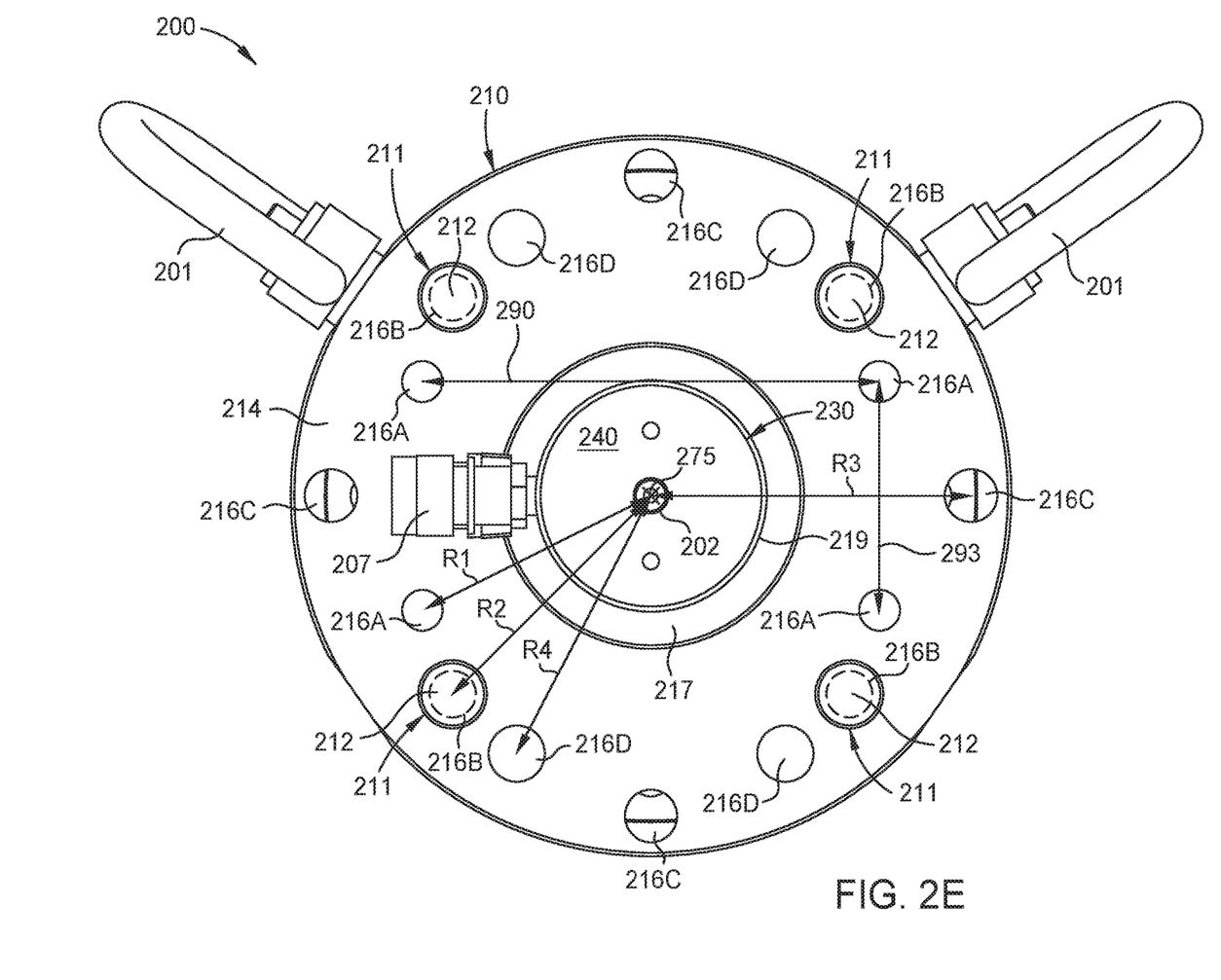
FIG. 2E is a schematic partial top view of the hub puller kit illustrated in FIGS. 2A-2D, according to one implementation.

FIG. 2E is a schematic partial top view of the hub puller kit 200 illustrated in FIGS. 2A-2D, according to one implementation. The adapter flange 210 includes a central axis 275. The central axis 275 aligned with a center of the central opening 219. The adapter flange 210 includes a first set of fastener openings 216A, the second set of fastener openings 216B (shown in ghost in FIG. 2E), a third set of fastener openings 216C, and a fourth set of fastener openings 216D formed therein and extending from the first surface 214 to the second surface 215. The second set of fastener openings 216B includes four fasteners 211 disposed at least partially therethrough. Each of the first set of fastener openings 216A, the second set of fastener openings 216B, the third set of fastener openings 216C, and the fourth set of fastener openings 216D includes at least two fastener openings. Each set of fastener openings 216A-216D includes four fastener openings.

The first set of fastener openings 216A include a first size (such as a first diameter), and are disposed at a first radius R1 relative to the central axis 275. The first set of fastener openings 216A include a first size (such as a first diameter), and are disposed at a first radius R1 relative to the central axis 275. The second set of fastener openings 216B include a second size (such as a second diameter), and are disposed at a second radius R2 relative to the central axis 275. The third set of fastener openings 216C include a third size (such as a third diameter), and are disposed at a third radius R3 relative to the central axis 275. The fourth set of fastener openings 216D include a fourth size (such as a fourth diameter), and are disposed at a fourth radius R4 relative to the central axis 275. The first through fourth radii R1-R4 are between respective opening center points (such as respective center axes) of the respective fastener openings 216A-216D and the central axis 275.

In one embodiment, which can be combined with other embodiments, the first size is lesser than the second size, the second size is lesser than the third size, and the third size is lesser than the fourth size. In one embodiment, which can be combined with other embodiments, the first radius R1 is lesser than the second radius R2 and/or the fourth radius R4, the second radius R2 is lesser than or equal to the fourth radius R4, and the fourth radius R4 is lesser than the third radius R3.

In one embodiment, which can be combined with other embodiments, the first set of fastener openings 216A are sized and arranged to align with openings of a first hub standard, the second set of fastener openings 216B are sized and arranged to align with openings of a second hub standard, the third set of fastener openings 216C are sized and arranged to align with openings of a third hub standard, and the fourth set of fastener openings 216D are sized and arranged to align with openings of a fourth hub standard. In one example, the first hub standard is for a J800 hub, the second hub standard is for a 390.60 hub, the third hub standard is for a 390.65 hub, and the fourth hub standard is for a J1200 hub.

In one embodiment, which can be combined with other embodiments, the first set of fastener openings 216A are arranged in a first rectangular pattern, the second set of fastener openings 216B are arranged in a square pattern, the third set fastener openings 216C are arranged in a circular pattern, and the fourth set of fastener openings 216D are arranged in a second rectangular pattern. The first rectangular pattern is oriented 90 degrees relative to the second rectangular pattern. In one example, an X-dimension of the square pattern is about equal to a Y-dimension of the square pattern, and the circular pattern is about equidistant with the third set of fastener openings 216C disposed about 90 degrees from each other. In one example, the first rectangular pattern of the first set of fastener openings 216A includes an X-dimension 290 that is larger than a Y-dimension 293, and the second rectangular pattern of the fourth set of fastener openings 216D includes an X-dimension that is lesser than a Y-dimension.

In one embodiment, which can be combined with other embodiments, a first diameter of the openings of the first set of fastener openings 216A is within a range of 0.75 inches to 0.85 inches. In one embodiment, which can be combined with other embodiments, a fourth diameter of the openings of the fourth set of fastener openings 216D is within a range of 0.86 inches to 1.00 inches.

The X-dimension 290 of the first rectangular pattern of the first set of fastener openings 216A, when measured between centers of openings on one side (e.g., a left side) of the central opening 219 and centers of openings on the other side (e.g., a right side) of the central opening 219, is within a range of 7.80 inches to 7.90 inches. The Y-dimension 293 of the first rectangular pattern of the first set of fastener openings 216A, when measured between centers of openings on one side (e.g., an upper side) of the central opening 219 and centers of openings on the other side (e.g., a lower side) of the central opening 219, is within a range of 3.90 inches to 4.00 inches.

The Y-dimension of the second rectangular pattern of the fourth set of fastener openings 216D, when measured between centers of openings on one side (e.g., an upper side) of the central opening 219 and centers of openings on the other side (e.g., a lower side) of the central opening 219, is within a range of 8.85 inches to 8.95 inches. The X-dimension of the second rectangular pattern of the fourth set of fastener openings 216D, when measured between centers of openings on one side (e.g., a left side) of the central opening 219 and centers of openings on the other side (e.g., a right side) of the central opening 219, is within a range of 4.60 inches to 4.70 inches.

In one embodiment, which can be combined with other embodiments, a second diameter of the openings of the second set of fastener openings 216B is within a range of 0.75 inches to 1.11 inches. In one embodiment, which can be combined with other embodiments, a third diameter of the openings of the third set of fastener openings 216C is within a range of 0.85 inches to 1.2 inches. In one example, the second diameter is equal to the third diameter.

The second set of fastener openings 216B are disposed equidistantly from each other angularly about the central opening 219, such as about 90 degrees from each other angularly about the central opening 219. The third set of fastener openings 216C are disposed equidistantly from each other angularly about the central opening 219, such as about 90 degrees from each other angularly about the central opening 219. In one embodiment, which can be combined with other embodiments, the second radius R2 is within a range of 4.7 inches to 4.85 inches. In one embodiment, which can be combined with other embodiments, the third radius R3 is within a range of 5.3 inches to 5.55 inches.

The present disclosure contemplates that configurations of the first through fourth sets of openings 216A-216D may be altered. For example, the patterns of one or more of the sets of openings 216A-216D may be rotated, such as by 30 degrees or 90 degrees.

Figure 2F:
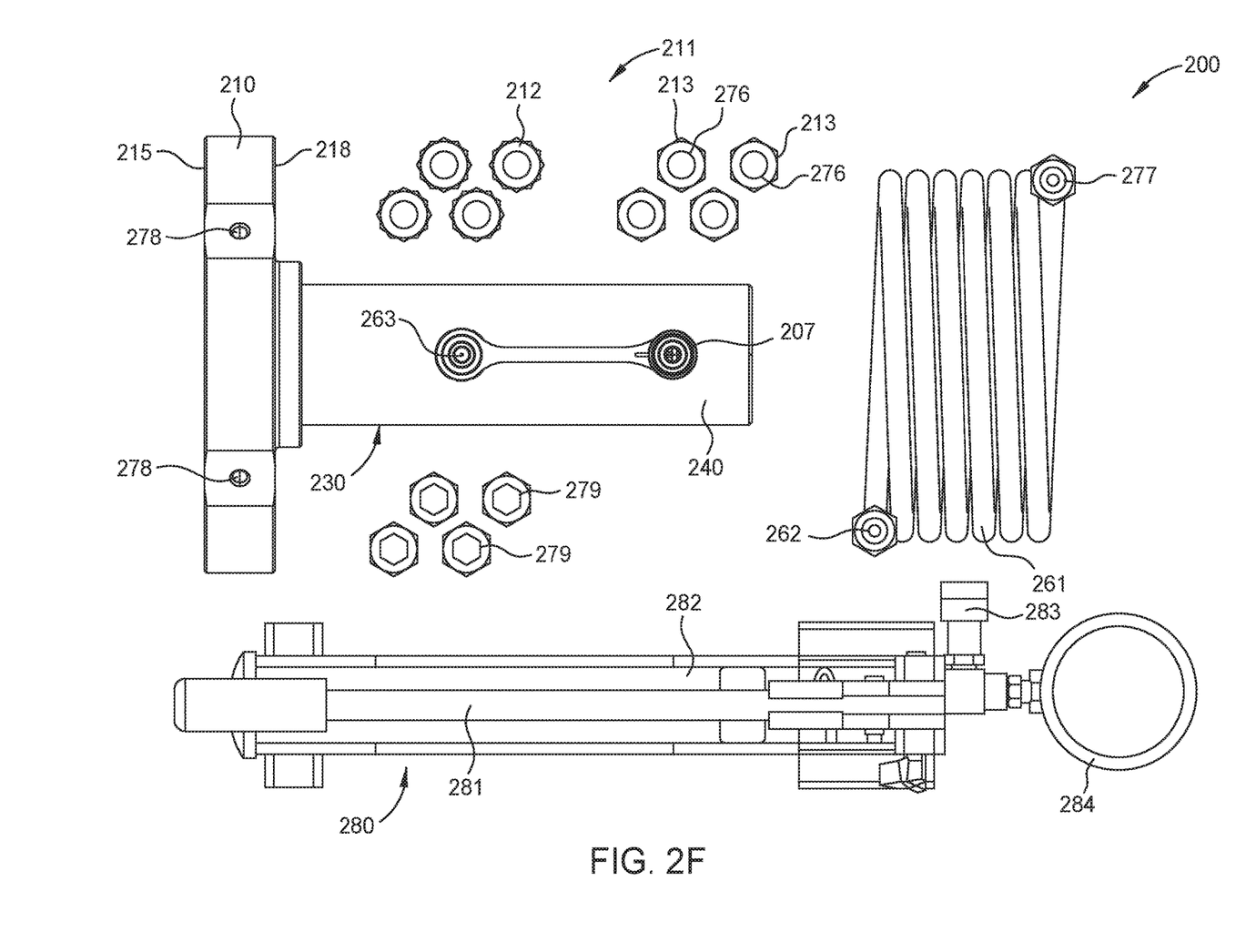
FIG. 2F is a schematic partial view of the hub puller kit illustrated in FIGS. 2A-2E, according to one implementation.

FIG. 2F is a schematic partial view of the hub puller kit 200 illustrated in FIGS. 2A-2E, according to one implementation. The plurality of fasteners 211 includes the plurality of bolts 212 (four bolts 212 are shown) and the plurality of nuts 213 (four nuts 213 are shown). Each bolt 212 includes a threaded bolt portion and each nut 213 includes a threaded nut portion 276. The threaded nut portion 276 and the threaded bolt portion have the same thread pitch. The hydraulic hose 261 includes the first connection 262 at the first end thereof and a second connection 277 at a second end thereof. The adapter flange 210 includes a plurality of openings 278 formed in an outer surface thereof. In one example, the openings 278 receive a plurality of lift fasteners 279 that thread into the openings 278 to fasten the lift handles 201 to the adapter flange 210. The lift fasteners 279 may include one or more of bolts, screws, pins, rivets, and/or nuts. In one example, the outer surface of the adapter flange 210 includes an outer diameter that is less than 25 inches, such as about 12 inches.

The hub puller kit 200 includes a hydraulic pump 280. The hydraulic pump 280 includes a lever 281, a housing 282, a hydraulic conduit 283, and a pressure gauge 284. When the adapter flange 210 is fastened to the hub 180, the first connection 262 of the hydraulic hose 261 is coupled to the hydraulic conduit 207 of the hydraulic actuator 230, and the second connection 277 is connected to the hydraulic conduit 283 of the hydraulic pump 280. Moving the lever 281 relative to the housing 282 actuates a pressure rod in the housing 282 to pressurize the hydraulic fluid FL and pump the hydraulic fluid FL from the hydraulic pump 280, through the hydraulic hose 261, and into the hydraulic actuator 230 to hydraulically actuate the hydraulic cylinder 240 and the hydraulic plunger 250. In one example, the lever 281 is moved using a human foot or a human hand.

Aspects of the hub puller kit 200 facilitate benefits of a portable and compact hub puller kit 200 that may be transported easily and quickly, and used in a variety of circumstances and environments. Aspects of the hub puller kit 200 also facilitate benefits of modularity and the ability to effectively remove various types of hubs using a single hub puller kit 200. Aspects of the hub puller kit 200 also facilitate quick and easy removal of hubs to facilitate quick and easy service, maintenance, and/or replacement of power end 170 components. Aspects of the hub puller kit 200 facilitate quicker and easier removal of hubs, and reduced risk of damage to hub puller kit 200 components and power end 170 components, in relation to methodologies where forces are mechanically generated on hubs—rather than hydraulically generated—and methodologies where hubs are heated and then hammered off of pinion shafts. As an example, aspects of the hub puller kit 200 facilitate the ability to quickly and effectively generate removal forces on the hub using manual human operation to hydraulically generate the removal forces.

It is contemplated that one or more of the aspects disclosed herein may be combined. Moreover, it is contemplated that one or more of these aspects may include some or all of the aforementioned benefits.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. A hub puller kit for power ends of frac pumps, the hub puller kit comprising:
    an adapter flange formed out of a monolithic body, comprising a first surface, a second surface, one or more sets of fastener openings extending from the first surface to the second surface, and a central opening, the one or more sets of fastener openings disposed radially outside of the central opening, wherein the adapter flange further comprises a stepped surface formed on the first surface and a recessed surface formed in the second surface, and wherein the central opening comprises a threaded flange portion that extends from the stepped surface to the recessed surface; and
    a hydraulic actuator coupled to the adapter flange, the hydraulic actuator comprising a hydraulic cylinder and a hydraulic plunger disposed at least partially within the hydraulic cylinder, wherein the hydraulic cylinder comprises a threaded actuator portion that engages the threaded flange portion to couple the hydraulic actuator to the adapter flange, wherein the hydraulic plunger is movable between an extended position and a retracted position, and wherein the hydraulic plunger extends through the entire threaded flange portion of the central opening when in the extended position.

2. The hub puller kit of claim 1, wherein the threaded actuator portion is formed on a recessed outer surface of the hydraulic cylinder, and wherein the threaded actuator portion is threaded into the threaded flange portion such that a shoulder of the hydraulic cylinder engages the first surface of the adapter flange.

3. The hub puller kit of claim 2, wherein the threaded flange portion and the threaded actuator portion have the same thread pitch.

4. The hub puller kit of claim 1, further comprising a plurality of bolts, each bolt of the plurality of bolts comprising a threaded bolt portion, and a plurality of nuts, each nut of the plurality of nuts comprising a threaded nut portion.

5. The hub puller kit of claim 4, wherein the threaded bolt portion and the threaded nut portion have the same thread pitch.

6. The hub puller kit of claim 1, wherein the adapter flange comprises a central axis, and the one or more sets of fastener openings comprise:

a first set of at least two fastener openings disposed at a first radius relative to the central axis, the first set of at least two fastener openings comprising a first size, and a second set of at least two fastener openings disposed at a second radius relative to the central axis, the second set of at least two fastener openings comprising a second size.

7. The hub puller kit of claim 1, further comprising:

a hydraulic pump, the hydraulic pump comprising a hydraulic conduit; and a hydraulic hose, the hydraulic hose comprising a first connection at a first end of the hydraulic hose and a second connection at a second end of the hydraulic hose.

8. The hub puller kit of claim 1, further comprising one or more lift handles coupled to the adapter flange.

9. A method of removing a hub from a pinion shaft of a power end using the hub puller kit of claim 1, the method comprising:

positioning the adapter flange of the hub puller kit adjacent a first surface of the hub;

fastening the adapter flange to the hub;

pressurizing the hydraulic actuator coupled to the adapter flange to apply a first force to the hub in a first direction and a second force to the pinion shaft in a second direction, the second direction being opposite of the first direction; and moving the hub away from the pinion shaft.

10. The method of claim 9, wherein the pressurizing the hydraulic actuator comprises pumping a hydraulic fluid into an internal chamber of the hydraulic cylinder.

11. The method of claim 10, wherein the pumping the hydraulic fluid into the internal chamber comprises flowing the hydraulic fluid through a hydraulic conduit coupled to the hydraulic cylinder and through a fluid opening formed in the hydraulic cylinder.

12. The method of claim 11, wherein the pumping the hydraulic fluid into the internal chamber comprises moving a lever of a hydraulic pump to flow the hydraulic fluid through a hydraulic hose coupled to the hydraulic conduit at a first end and the hydraulic pump at a second end.

13. The method of claim 10, wherein the pumping the hydraulic fluid into the internal chamber comprises generating a first hydraulic force on the hydraulic cylinder in the first direction, and generating a second hydraulic force on the hydraulic plunger in the second direction, wherein the first hydraulic force generated on the hydraulic cylinder applies the first force to the hub, and the second hydraulic force generated on the hydraulic plunger applies the second force to the pinion shaft.

14. The method of claim 13, wherein the pressurizing the hydraulic actuator comprises:

moving the hydraulic cylinder relative to the hydraulic plunger; and moving the hub relative to the pinion shaft.

15. The method of claim 10, wherein the threaded actuator portion is an outer surface of the hydraulic cylinder that is threaded into the threaded flange portion, which is an inner surface of the adapter flange.

16. The method of claim 9, wherein the positioning the adapter flange of the hub puller kit adjacent the first surface of the hub comprises moving the pinion shaft at least partially into a recess formed by the recessed surface in the adapter flange.

17. The method of claim 9, wherein the positioning the adapter flange of the hub puller kit adjacent the first surface of the hub comprises lifting one or more lift handles coupled to the adapter flange, and moving the adapter flange.

18. The method of claim 9, wherein the fastening the adapter flange to the hub comprises:

disposing a plurality of bolts through at least one of the one or more sets of fastener openings formed in the adapter flange and through a set of openings formed in the hub; and threading a plurality of nuts onto the plurality of bolts.

19. The hub puller kit of claim 1, wherein the hydraulic plunger extends at least partially through the threaded flange portion of the central opening when in the retracted position.

* * * * *